United States Patent [19]

Bott

[11] 4,448,336
[45] May 15, 1984

[54] COMBINATION OF PERMANENT LUGGAGE CARRIER ADAPTERS WITH SELECTED AND REMOVABLE PRIMARY LUGGAGE CARRIERS

[76] Inventor: John A. Bott, 931 Lakeshore Dr., Grosse Pointe Shores, Mich. 48236

[21] Appl. No.: 274,868

[22] Filed: Jun. 18, 1981

Related U.S. Application Data

[63] Continuation-in-part of Ser. No. 39,391, May 15, 1979, Pat. No. 4,277,009.

[51] Int. Cl.³ .............................................. B60R 9/10
[52] U.S. Cl. ................................. 224/309; 224/321; 224/325
[58] Field of Search ............... 224/309, 314, 319, 321, 224/324, 325, 326, 327

[56] References Cited

U.S. PATENT DOCUMENTS

| 3,223,302 | 12/1965 | Helm | 224/319 |
|---|---|---|---|
| 3,253,755 | 5/1966 | Bott | 224/42.1 |
| 3,325,067 | 6/1967 | Helm | 224/42.1 |
| 3,473,773 | 10/1969 | Meyer | 224/309 X |
| 3,519,180 | 7/1970 | Bott | 224/42.1 |
| 3,719,313 | 3/1973 | Tischler | 224/309 |
| 3,724,730 | 4/1973 | Olsen et al. | 224/309 |
| 4,055,284 | 10/1977 | Bott | 224/42.1 |
| 4,342,411 | 8/1982 | Bott | 224/319 |

Primary Examiner—Steven M. Pollard
Attorney, Agent, or Firm—Harness, Dickey & Pierce

[57] ABSTRACT

An automobile luggage carrier having a plurality of preferably for mounting receptacles permanently attached to the roof of the automobile to which other different types of primary luggage carriers may be selectively attached. For example, heavy-load utility bar assemblies may be attached to carry heavy loads, such as a boat, crate or large box; or standard luggage carrier assemblies, including slats or stanchions supporting elevated side rails, may be attached to carry lighter and less bulky loads, such as travel cases, smaller boxes and the like.

13 Claims, 13 Drawing Figures

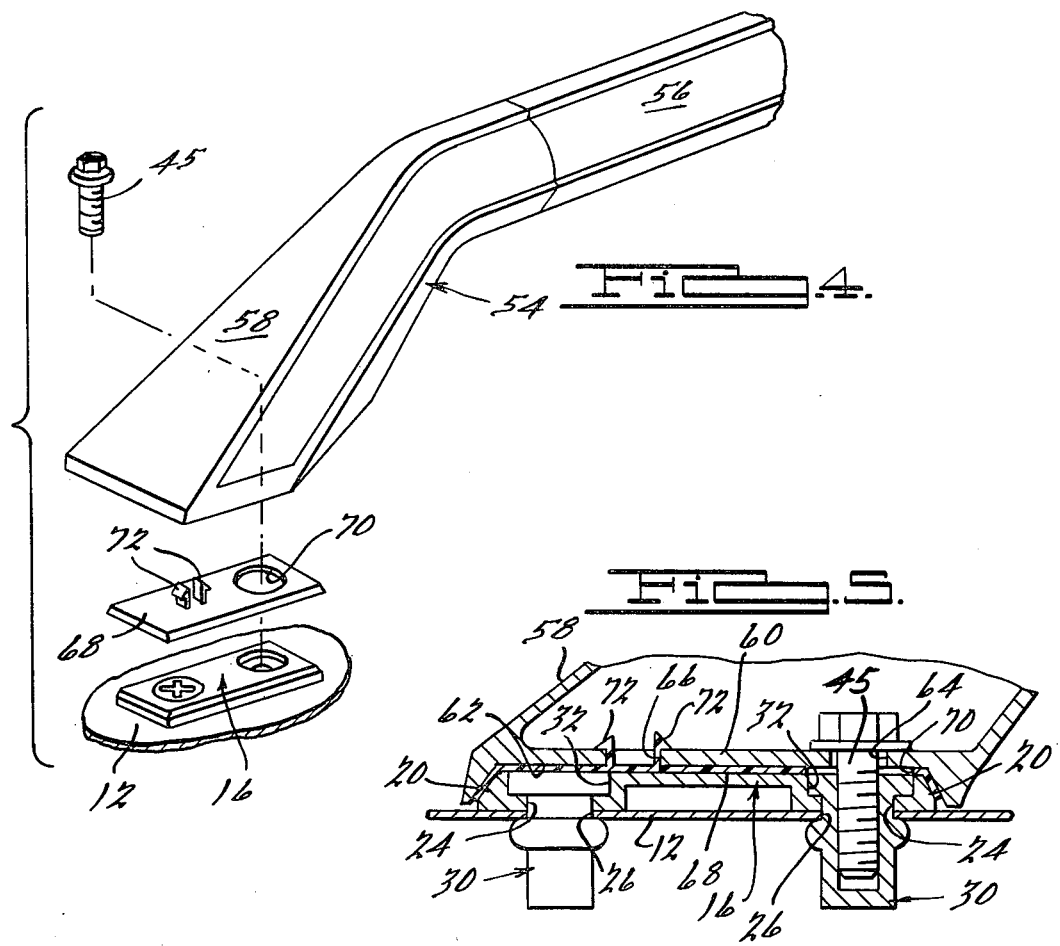
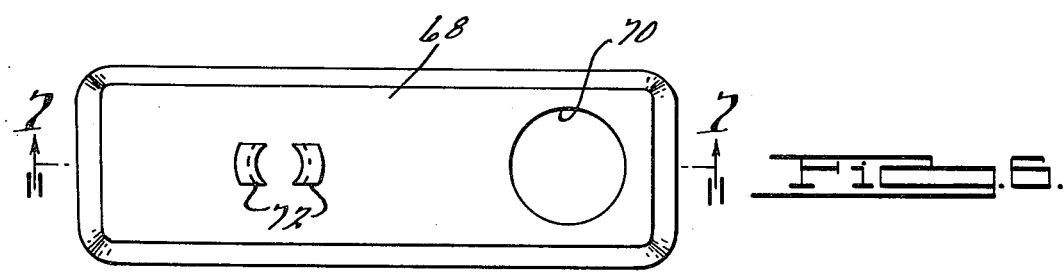
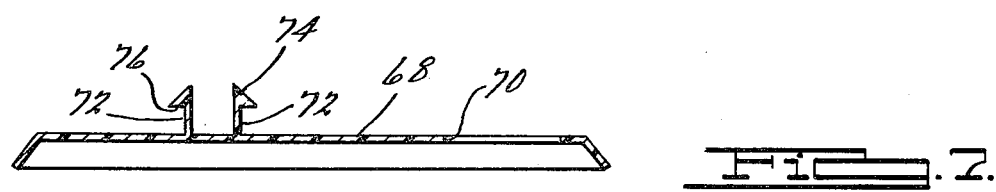

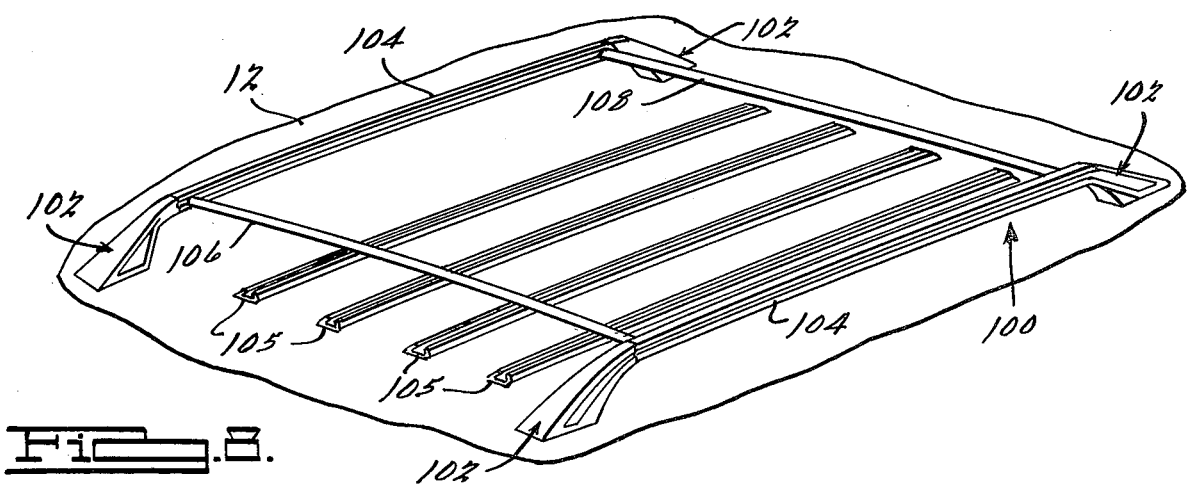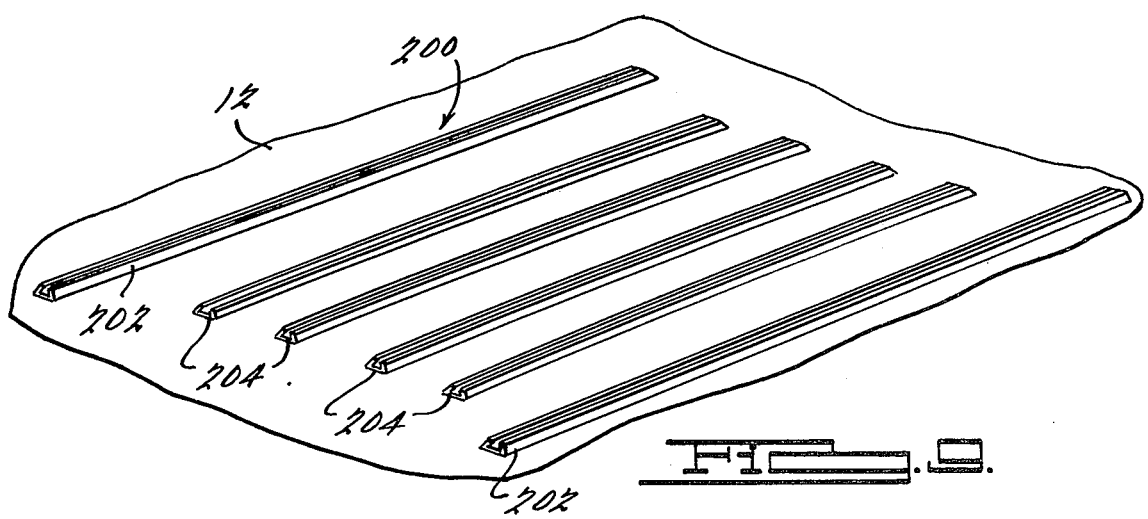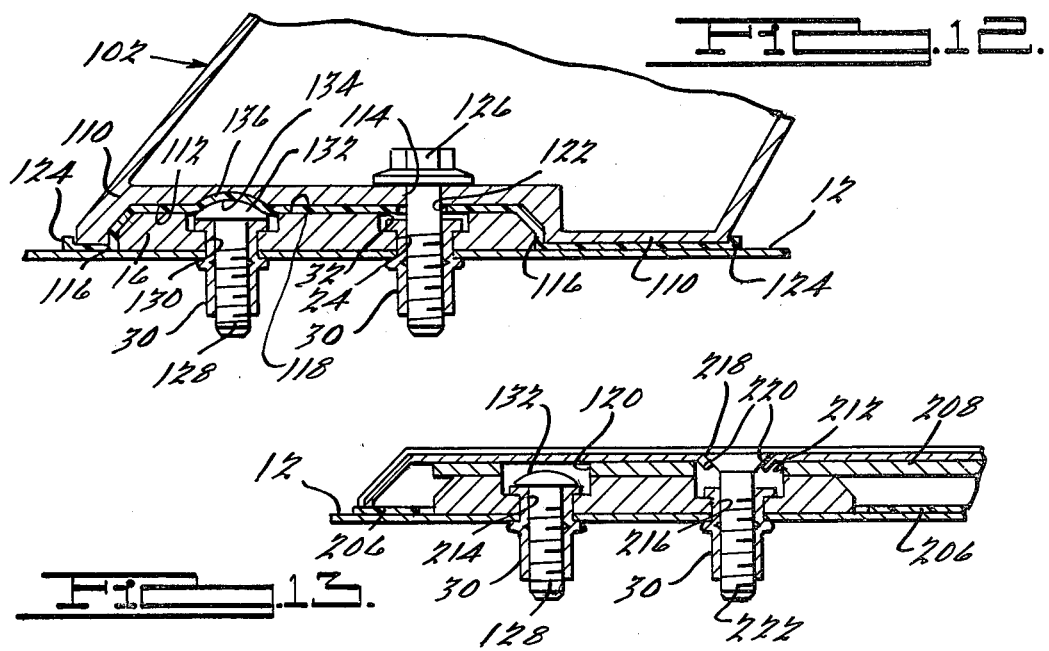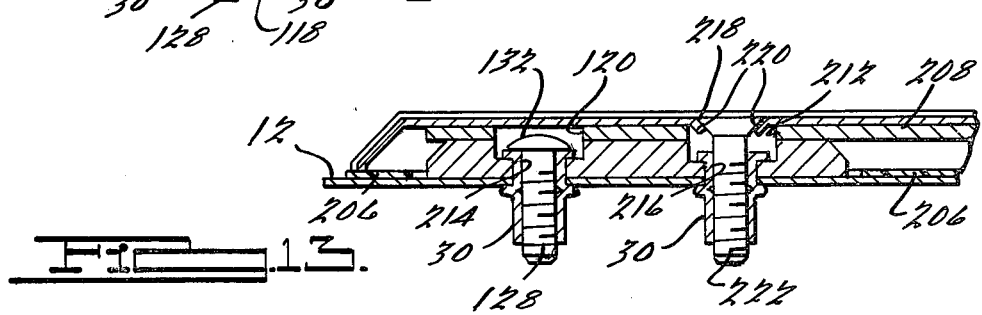

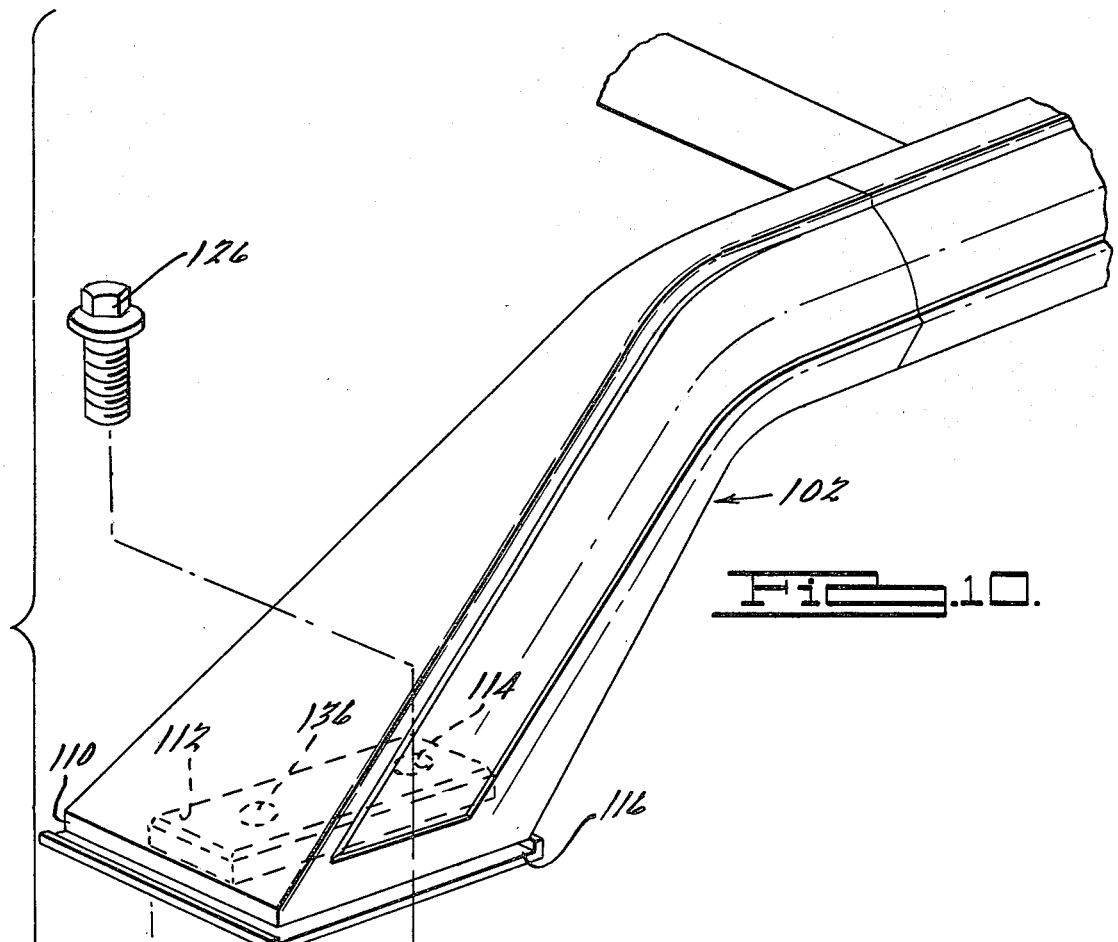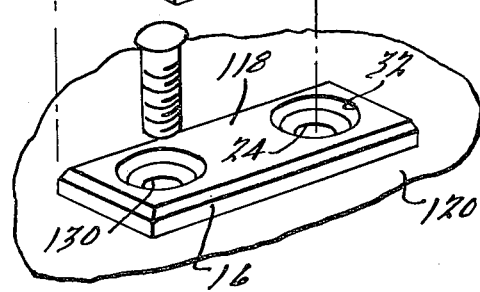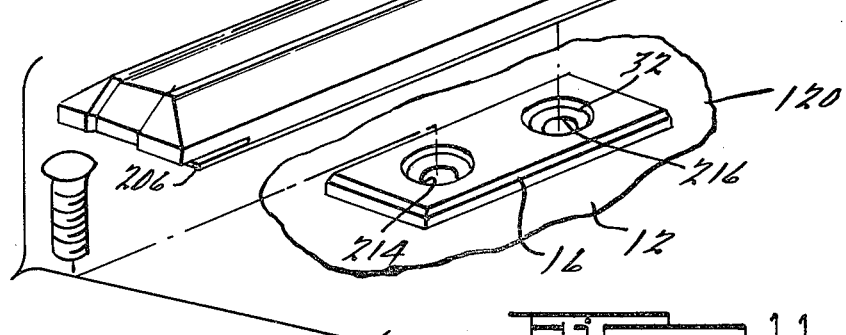

COMBINATION OF PERMANENT LUGGAGE CARRIER ADAPTERS WITH SELECTED AND REMOVABLE PRIMARY LUGGAGE CARRIERS

CROSS-REFERENCE TO RELATED APPLICATION

This application is a continuation-in-part of Ser. No. 39,391, filed May 15, 1979, now U.S. Pat. No. 4,277,009.

BACKGROUND OF THE INVENTION

Luggage carriers or racks have long been used on outer surfaces of automotive vehicles for carrying different types of articles, such as bulky boats, crates or large boxes, or a plurality of smaller articles such as travel cases, smaller boxes and the like. This has meant a different kind of attachment to the vehicle for each of these separate uses.

A known luggage carrier for large bulky objects is disclosed in Bott U.S. Pat No. 4,055,284, granted Oct. 25, 1977.

A known luggage carrier assembly having fixed stanchions and elevated side rails for travel cases and smaller objects is disclosed in Bott U.S. Pat No. 3,519,180, granted July 7, 1976.

A luggage carrier assembly or system for carrying a myriad of different objects and having a multitude of various accessories is disclosed in Bott U.S. Pat. Nos. 4,099,658, granted July 11, 1978, and 4,182,471, granted Jan. 8, 1980.

SUMMARY OF THE INVENTION

According to the present invention special means in the form of a plurality of mounting receptacles are permanently attached to the horizontal roof of an automotive vehicle. As illustrated in the examples disclosed there are four of such receptacles mounted adjacent the corner areas of the vehicle top. These receptacles are thus available at all times to accommodate a selected primary type of luggage carrier. A pair of aluminum heavy load utility bars may be mounted transversely of the top adjacent the front and rear of the top with the ends of the utility bars secured to the receptacles through spacer block adapters. Tie-down loops are disposed on the utility bars and a boat, crate or box lashed thereto by roping.

Alternative arrangements which may be included as a luggage carrier system include a conventional fixed stanchion luggage carrier, having either fixed or slidable cross rails, or as a slat-type luggage rack with either a pair of decorative slats over the mounting receptacles or a pair of channelled slats permitting the functions set forth in Bott U.S. Pat. Nos. 4,099,658, 4,182,471, and other Bott patents.

To convert the carrier to other uses is a simple matter since the mounting receptacles are permanent attachments to the vehicle top and all that is necessary is to remove one luggage carrier assembly and substitute another luggage carrier assembly as selectively desired.

The mounting receptacles are preferably attached to the vehicle top by closed-end, blind fasteners having preformed internal threads which perform, in effect, as anchor nuts for the reception of studs to removably attach the utility bars and spacer blocks, the stanchions of more conventional luggage carriers, or the slats.

Thus, this invention provides a simple conversion from one type of carrier to another and lends itself to a variety of options.

BRIEF DESCRIPTION OF THE DRAWINGS

FIG. 4 is a partial, separated perspective view of the present invention illustrating the parts of another form of a primary luggage carrier attached to the vehicle roof surface;

FIG. 5 is a cross-sectional view of the assembled parts shown in FIG. 4;

FIG. 6 is a plan view of one of the elements, namely, the supplemental pad, shown in FIGS. 4 and 5;

FIG. 7 is a cross-sectional view taken substantially along the line 7—7 of FIG. 6;

FIG. 8 is an elevated perspective view of another form of a primary luggage carrier of a conventional fixed stanchion type having elevated side rails;

FIG. 9 is an elevated perspective view of another form of a primary luggage carrier attached to the vehicle roof surface;

FIG. 10 is a separated perspective view of the permanent attachment means in relationship to the cooperating parts of the primary luggage carrier of the type illustrated in FIG. 8;

FIG. 11 is a separated perspective view of the permanent attachment means in relationship to the cooperating parts of the primary luggage carrier of the type illustrated in FIG. 9;

FIG. 12 is a cross-sectional view of the assembled parts illustrated in FIG. 10; and FIG. 13 is a cross-sectional view of the assembled parts illustrated in FIG. 11.

DETAILED DESCRIPTION OF THE ILLUSTRATED EMBODIMENTS OF THE INVENTION

Figure 1:
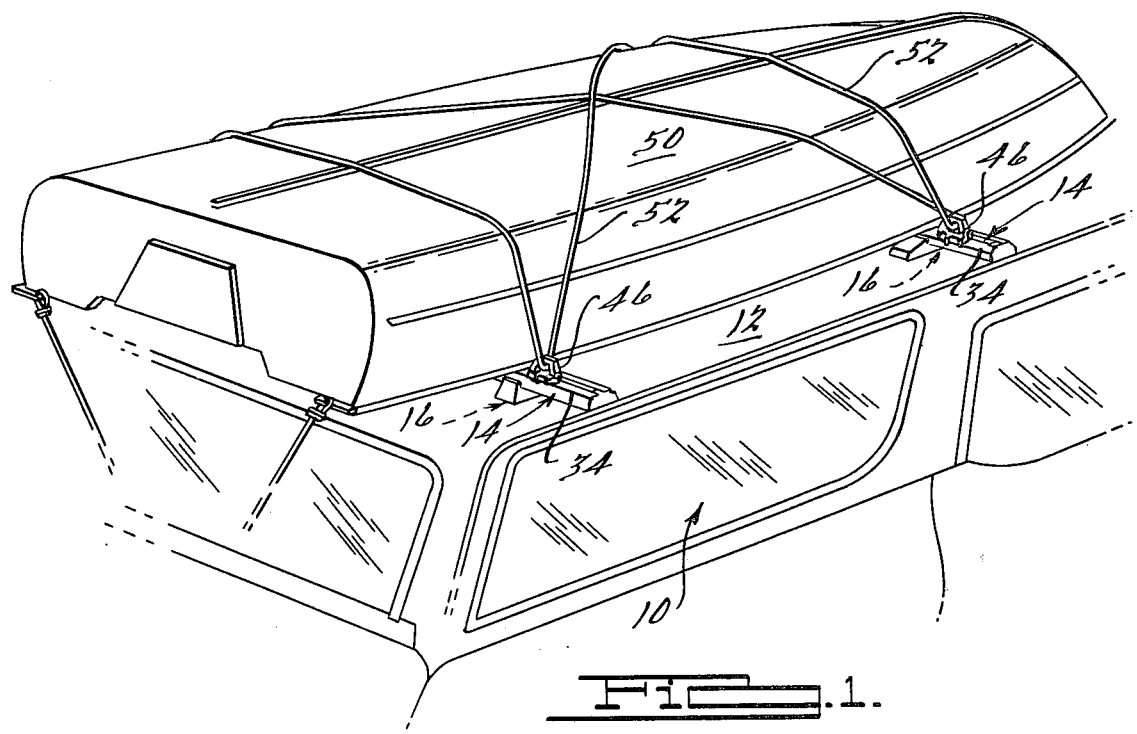
FIG. 1 is a fragmentary perspective view of an automobile having an article carrier of one type removably attached thereto through permanent adapters according to the present invention.
Figure 2:
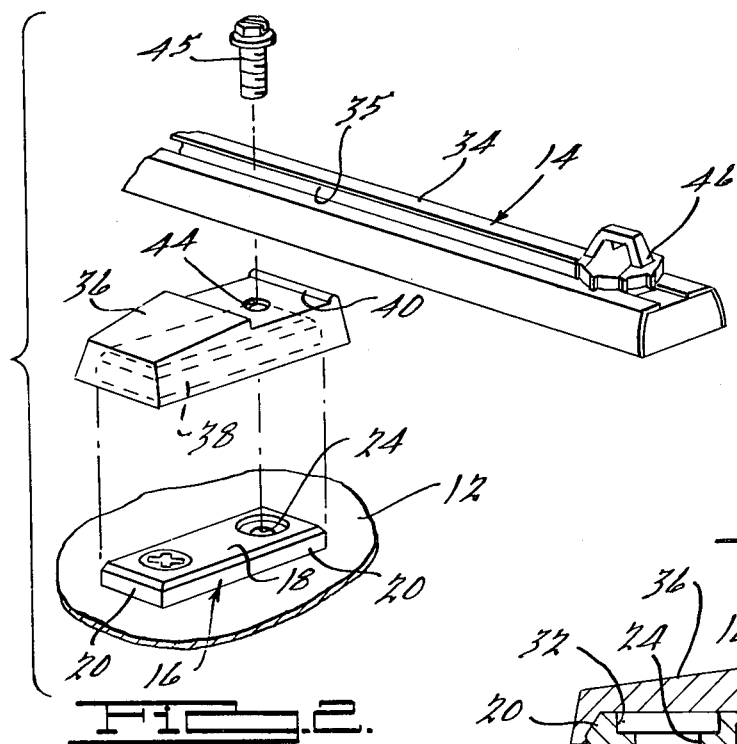
FIG. 2 is a separated perspective view of the permanent attachment means in relationship to the cooperating parts of the primary luggage carrier of the type illustrated in FIG. 1.
Figure 3:
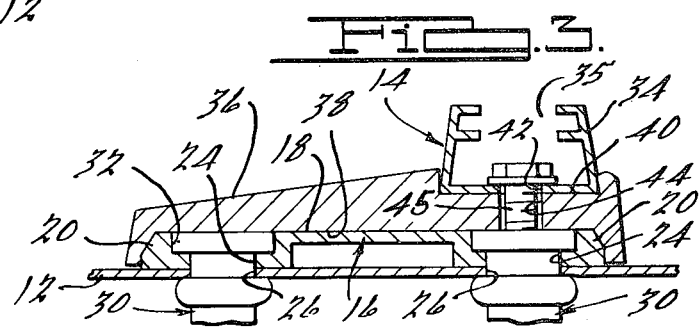
FIG. 3 is a cross-sectional view of the assembled parts shown in FIG. 2.

Referring to FIGS. 1 through 3, one embodiment of the invention is illustrated for removably supporting a removable primary luggage carrier of the type employed to carry large bulky articles such as a boat.

A portion of an automotive vehicle is generally indicated at 10 which includes a top surface 12 to which a primary article or luggage carrier 14 is removably mounted.

The carrier 14 is connected to the roof 12 through four receptacle members 16 which are permanently attached to the roof 12 at the four-corner areas of the roof, there being one pair of receptacles 16 adjacent the forward area of the roof and the other pair adjacent the rear area of the roof.

The receptacles or mounting members 16 are generally rectangular in form with a flat top 18 and depending side walls 20.

Each receptacle 16 has a pair of spaced openings 24 adapted to be positioned over underlying openings 26, respectively, in the roof 12. Each opening 24 is formed with a countersink 32 in its top surface and fasteners 30 are received in and through the aligned openings 24 and 26 to permanently secure each receptacle 16 to its proper position on the roof in one of the four-corner areas.

The fasteners 30 are preferably of the type known in the fastener art as one-piece metal blind rivets with internal threads that act as anchor nuts. The preferred one is the closed end type so as to prevent water from entering the body under the roof. When placed in holes 24 and 26 the threaded section of the rivet is pulled by a threaded stud, while the head is held by the tool anvil and the shank on the blind side is caused to expand at the center section to lock the rivet in place and permanently secure the receptacles 16 to the roof 12.

Such blind fasteners 30 have been known for years and are readily available under the tradename RIV-NUTS. Their use has particular utility in the combination here disclosed.

The openings 24 terminate in countersinks 32 adjacent the tops so that the tops of the fasteners 30 are confined in the countersink of the receptacles 16.

In the embodiment of FIGS. 1 through 3, the primary article or luggage carrier 14 comprises a pair of transverse, heavy load utility bars 34. Such bars 34 may be of substantially the same cross-sectional configuration as the cross bars 40 in the co-pending application of J. A. Bott, Ser. No. 9,608, filed Feb. 5, 1979, now U.S. Pat. No. 4,239,139, issued Dec. 16, 1980, in that they are in the shape of upwardly opening channels. There is one of such bars 34 disposed across the top 12 adjacent the forward and rear areas of the roof overlying the corresponding pairs of receptacles 16.

The ends of the bars 34 are each connected to the underlying receptacle 16 by an interposed spacer block 36. The blocks 36 are formed with an undersurface recess 38 complementary in shape to the peripheral shape of the receptacles which project above the surface of the roof.

The blocks 36 are each formed with a transverse slot 40 in the top which is adapted to receive the adjacent end of the bar 34. Aligned openings 42 and 44 are formed in the bar 34 and the block 36, respectively. A stud 45 is passed through the openings 42 and 44 and is threaded into the internally threaded shank of the fastener 30 to secure the bars 34 to their respective blocks 36.

Tie-down studs 46 are disposed adjacent the ends of the bars 34 and are adjustably positioned thereon similar to the way corresponding tie-down studs 32 are mounted on their bars 40 in the co-pending application of Bott above identified.

In this embodiment a large boat 50 is mounted on the cross bars 34 and lashed thereto by a rope 52 which is secured through the openings in the tie-downs at the fourcorner areas in the usual way.

Referring to FIGS. 4 through 7, a different form of luggage carrier 54 is mounted on the receptacles 16. Such carrier 54 may generally be of the type shown in Bott Pat. No. 3,519,180 above referred to. Such carrier 54 includes longitudinally extending side rails 56, at each side, terminating in stanchions 58.

The base 60 of each stanchion is formed with a recess 62 complementary in shape to the exterior configuration of the receptacle 16 to receive the receptacle therein. Each base 60 is provided with spaced openings 64 and 66 therein.

A molded support pad 68, preferably of high density polyethylene, is disposed between the top of receptacle 16 and the undersurface of the stanchion base 60 and has a complementary configuration to both. The pad 68 has an opening 70 aligned with openings 64 and 24. The pad 68 is also formed with upwardly directed integral and resilient fingers 72, the upper ends of which terminate in beveled outer sides 74 with horizontal under edges 76. The fingers 72 are aligned with the opening 66 in the stanchion base so that in the assembly the fingers are snapped through the openings 66 to position the stanchions on the receptacles 16.

A stud 45 is passed through the openings 64 and 70 and then threaded into the internal threaded shank of the fastener 30 to secure the stanchions 58 of the primary carrier 54 to the receptacles 16 and to the vehicle roof.

Referring to FIGS. 8, 10 and 12 still another embodiment of a primary luggage carrier system 100 is illustrated mounted on the vehicle top surface 12 having four fixed stanchions 102, elevated longitudinally extending side rails 104 disposed between each pair of stanchions 102, and front 106 and rear 108 longitudinally extending cross rails disposed laterally across the top surface 12 between the side rails 104 again similar to the luggage carrier disclosed in Bott U.S. Pat. No. 3,519,180. Also included are a series of inner slats 105 upon which a load can be disposed interior to the side rails 104 and cross rails 106 and 108. The cross rails 106 and 108 may be both slideable, both fixed, or one slideable and one fixed. Alternatively, the cross rails 106 and 108 may be disposed laterally between the stanchions 102 rather than between the side rails 104 (not shown).

Each of the stanchions 102 is constructed of molded plastic and similar to the stanchions 58 of the embodiment illustrated in FIG. 4. The base 110 of each stanchion 102 is formed with a recess 112 complementary in shape to the exterior configuration of the receptacle or element 16 to receive the receptacle therein. Each base 110 is provided with an aperture 114 in the recess 112 of the base 110. A molded support pad 116, preferably of high density polyethylene, is disposed between the undersurface of the base 110 of a stanchion 102 and the combination of the top surface 118 of element 16 and the portion 120 of the vehicle surface 12 immediately surrounding the element 16, and has a complementary configuration to all of the surfaces. The pad 116 has an aperture 122 aligned with aperture 114 of the stanchion base 110, and openings 32 and 24 of the element 16 and vehicle surface 12 respectively. The pad 116 also has an upwardly extending flange 124 along the periphery thereof to further aid in locating the pad 116 with the base of the stanchion when assembled.

A bolt or stud 126 is passed through apertures 114 and 122 and opening 24 into threaded engagement with the internal threaded shank of fastener 30 to secure each stanchion of the primary carrier system 100 to a receptacle 16 and thereby to the vehicle roof.

The receptacle 16 is identical to that described above, and is secured to the vehicle top surface 12 by RIV-NUT fasteners 30. In this embodiment, however, a bolt 128 is placed in the aperture 130 not used for the securement of the stanchion 102 to the receptacle or element 16, the apertures closer to the outer periphery of the luggage carrier 100 in this embodiment. The bolt 128 has a head 132 capable of protruding above the top surface 118 of the element 16. Complementary recesses 134 and 136 are formed in the pad 116 and in the recess 112 of the stanchion 102, respectively. In assembly, the head 132 of the bolt 128 along with the sides of the receptacle 16 will align the pad 116 and stanchion 102 on the receptacle 16. This added alignment feature is equally applicable to the spacer blocks 36 of FIGS. 1-3 and the stanchions 58 and pads 68 of FIGS. 4-7.

A further alternative embodiment of a primary luggage carrier system 200 is illustrated in FIGS. 9, 11, and 13. The luggage carrier system 200 comprises a pair of longitudinally extending outer slats 202 disposed on the vehicle top surface 12 in place of the stanchions and side rails of FIGS. 4 or 8 or the blocks and utility bars of FIG. 1. Also illustrated in FIG. 9 are a plurality of inner slats 204 which may or may not have the identical length and cross-section of the outer slats 202, as desired. The slats 202 and 204 each present a low profile configuration when mounted on the vehicle top surface 12, and may be either of a decorative type as illustrated in FIGS. 9, 11, and 13, having top surfaces used only as supporting surfaces, or may be of a channelled construction as set forth in Bott U. S. Pat. Nos. 4,099,658 and 4,182,471, allowing for all of the additional advantages of such a construction.

A pad 206 is set on the vehicle top surface 12 having portions cut away so that the pad 206 may set over and surrounding a pair of elements 16. A second pad 208 is secured to the underside of the slat 202 to provide added resiliency to the top surface of the slat 202. The second pad 208 has apertures 210 and 212 aligned with the apertures 214 and 216 of the receptacle 16. Aperture 210 permits clearance for the head 132 of bolt 128. At least two apertures 218 are formed in each slat 202 having a countersink portion 220. A countersink or flush head bolt 222 is disposed through apertures 218, 212, and 216 into threaded engagement with the internal threaded shank of the RIVNUT fastener 30 to removably secure the slat to an element 16 and the vehicle top surface 12.

Thus, with the receptacle or element 16 permanently attached to the vehicle top surface 12, an operator may selectively attach a different type of carrier, such as, for example, the type shown in FIGS. 1-3, 4-7, 8 (10 and 12), or 9 (11 and 13). Each of these types of carriers are completely interchangeable and also have additional variations based upon accessories that may be selectively added as desired. It will also be apparent to those skilled in the art that still other forms of primary carriers may be adapted for mounting on the permanent receptacles or elements 16 within the teaching of the present invention. With the embodiments disclosed herein, an operator may select a load bearing utility bar carrier or a carrier more suited to confining luggage within its interior portion (such as the elevated side rail/cross rail fixed stanchion carrier) when transporting a load and change to a decorative slat arrangement of the luggage carrier to reduce wind drag and increase fuel economy of the vehicle when a load is not being transported.

Formal changes may be made in the embodiments specifically illustrated without departing from the spirit and substance of the invention, the scope of which is set forth in the appended claims.

What is claimed is:

1. A load carrying system for use in conjunction with a substantially horizontal surface of an automotive vehicle, said system comprising a plurality of polygonal-shaped receptacles spaced over said surface and permanently attached thereto, each of said receptacles projecting above said surface and having at least one opening for the reception of a blind fastener, a first load carrier adapted for carrying loads of one type, said first load carrier comprising elongated transversely extending elements and first mounting means having at least an opening therein and at least one bottom surface and having recess means associated with said bottom surface which substantially corresponds with the shape of each of said plurality of receptacles wherein said receptacles are substantially concealed when engaged said first mounting means to enable said transversely extending elements to be properly located with respect to said plurality of receptacles and removably secured thereto with said at least one opening of said first mounting means being aligned with said at least one opening of one of said receptacles, and a second load carrier adapted for carrying loads of another type, said second load carrier comprising elongated longitudinally extending elements and second mounting means having at least one opening therein and at least one bottom surface and having recess means associated with said bottom surface which substantially corresponds with the shape of each of said plurality of receptacles wherein said receptacles are substantially concealed in engagement with said second mounting means to enable said longitudinally extending elements to be properly located with respect to said plurality of receptacles and removably secured thereto, said first and second load carriers comprising interchangeable load carrying elements which are selectively attachable to said plurality of receptacles and removable therefrom.

2. In an automobile having a body with an exterior substantially horizontal surface, a load carrying system comprising a plurality of low profile permanently positioned attachment and positioning members disposed on said surface, each of said members being of a polygonal configuration and projecting above said surface and including a pair of openings for the reception of a pair of blind fasteners, first fastening means securing each of said members to one of each of said pair of blind fasteners associated therewith, and first and second load carriers comprising interchangeable load carrying elements which are selectively attachable to said attachment and positioning members and removable therefrom, each of said load carrying elements having an opening therein and a lower end portion, the underside of which is formed with a recess which is slightly larger than and of a generally complementary shape with respect to the shape of one of said attachment and positioning members so that when said load carrying elements are surmounted on said attachment and positioning members, said attachment and positioning members are substantially nestingly received within the recesses of said load carrying elements so that said load carrying elements are properly oriented upon the associated vehicle and so that said opening in each said load carrying element is aligned with the other of said pair of blind fasteners associated with each of said attachment and positioning members, whereby cooperating second fastening means may extend through said openings in said load carrying elements and into said other of said pair of blind fasteners associated with each of said attachment and positioning members to removably secure said load carrying elements of said luggage carrier system to said vehicle.

3. A load carrying system as set forth in claim 2, wherein said attachment and positioning members are disposed over said surface in opposed pairs in the four corner areas thereof.

4. A load carrying system as set forth in claim 3, wherein said first load carrier comprises two transversely extending utility bars for supporting a load, each utility bar being removably attachable adjacent its opposite ends to an opposed pair of said attachment and positioning members.

5. A load carrying system as set forth in claim 4, wherein said first load carrier further comprises a spacer block disposed above each of said attachment and positioning members, each said spacer block having a recess in its undersurface to receive an adjacent attachment and positioning member therein and a transverse recess formed in its top surface for receiving an end of a utility bar therein, and means for removably securing each said utility bar and said spacer blocks to an opposed pair of said attachment and positioning members.

6. A load carrying system as set forth in claim 3, wherein said second load carrier comprises two longitudinally extending confining elements, each said confining element defining an elevated rail member and terminating in stanchions which are disposed above and removably attachable to an opposed pair of said attachment and positioning members.

7. A load carrying system as set forth in claim 6, wherein each of said stanchions includes a recess in its undersurface to receive an adjacent attachment and positioning member therein, and said second load carrier further comprises means for removably securing each said stanchion to an adjacent attachment and positioning member.

8. A load carrying system as set forth in claim 7, wherein said second load carrier further comprises a mounting pad complementary in shape to the recess in the undersurface of each said stanchion and to the top surface of each adjacent attachment and positioning member which is interposed therebetween.

9. A load carrying system as set forth in claim 3, wherein said first load carrier comprises two elongated transversely extending utility bars for supporting a load, each said utility bar being removably attachable adjacent its opposite ends to an opposed pair of said attachment and positioning members, and said second load carrier comprises two longitudinally extending confining elements, each said confining element defining an elevated rail member and terminating in stanchions, said stanchions being removably attachable to an opposed pair of said attachment and positioning members.

10. A load carrying system as set forth in claim 3, wherein said first load carrier comprises two longitudinally extending confining elements, each said confining element defining an elevated rail member and terminating in stanchions, said stanchions being removably attachable to an opposed pair of said attachment and positioning members, and said second load carrier comprises two longitudinally extending slats having a low profile when mounted on said horizontal surface and being removably attachable to an opposed pair of said attachment and positioning members.

11. A load carrying system as set forth in claim 10, wherein said slats are primarily decorative.

12. A load carrying system as set forth in claim 10, wherein said slats are functional load carrying members.

13. A load carrying system as set forth in claim 12, wherein said slats have a longitudinally extending channel and means for clampingly securing support members to said slat.

* * * * *